United States Patent

[11] 3,581,150

[72] Inventors Thomas E. Kirk;
 Gerald H. Stenklyft, both of Anderson, Ind.
[21] Appl. No. 26,707
[22] Filed Apr. 8, 1970
[45] Patented May 25, 1971
[73] Assignee General Motors Corporation
 Detroit, Mich.

[54] OVERVOLTAGE PROTECTION CIRCUIT FOR A GENERATOR REGULATOR SYSTEM
 2 Claims, 1 Drawing Fig.
[52] U.S. Cl. ................................................ 317/16,
 317/31, 317/50, 320/64, 322/28
[51] Int. Cl. ..................................................... H02h 3/22,
 H02j 7/14
[50] Field of Search ........................................ 320/61, 64,
 SCR; 322/28; 317/13, 16, 31, 50

[56] References Cited
 UNITED STATES PATENTS
 3,488,560 1/1970 Konopa .......................... 320/SC
 3,491,285 1/1970 Nowakowski ................ 322/28x

*Primary Examiner*—J. D. Miller
*Assistant Examiner*—Harvey Fendelman
*Attorneys*—E. W. Christen, C. R. Meland and Robert W. Smith

ABSTRACT: An overvoltage protection circuit for a vehicle electrical generating system provides a plurality of controlled rectifiers connected to the generator output winding for shunting high transient voltages to ground. A control transistor having a time delay biasing circuit is connected to the field winding excitation circuit for holding the field winding deenergized during the high voltage condition. A single overvoltage detecting device is used to render both the plurality of controlled rectifiers and the control transistor conductive.

PATENTED MAY 25 1971
3,581,150
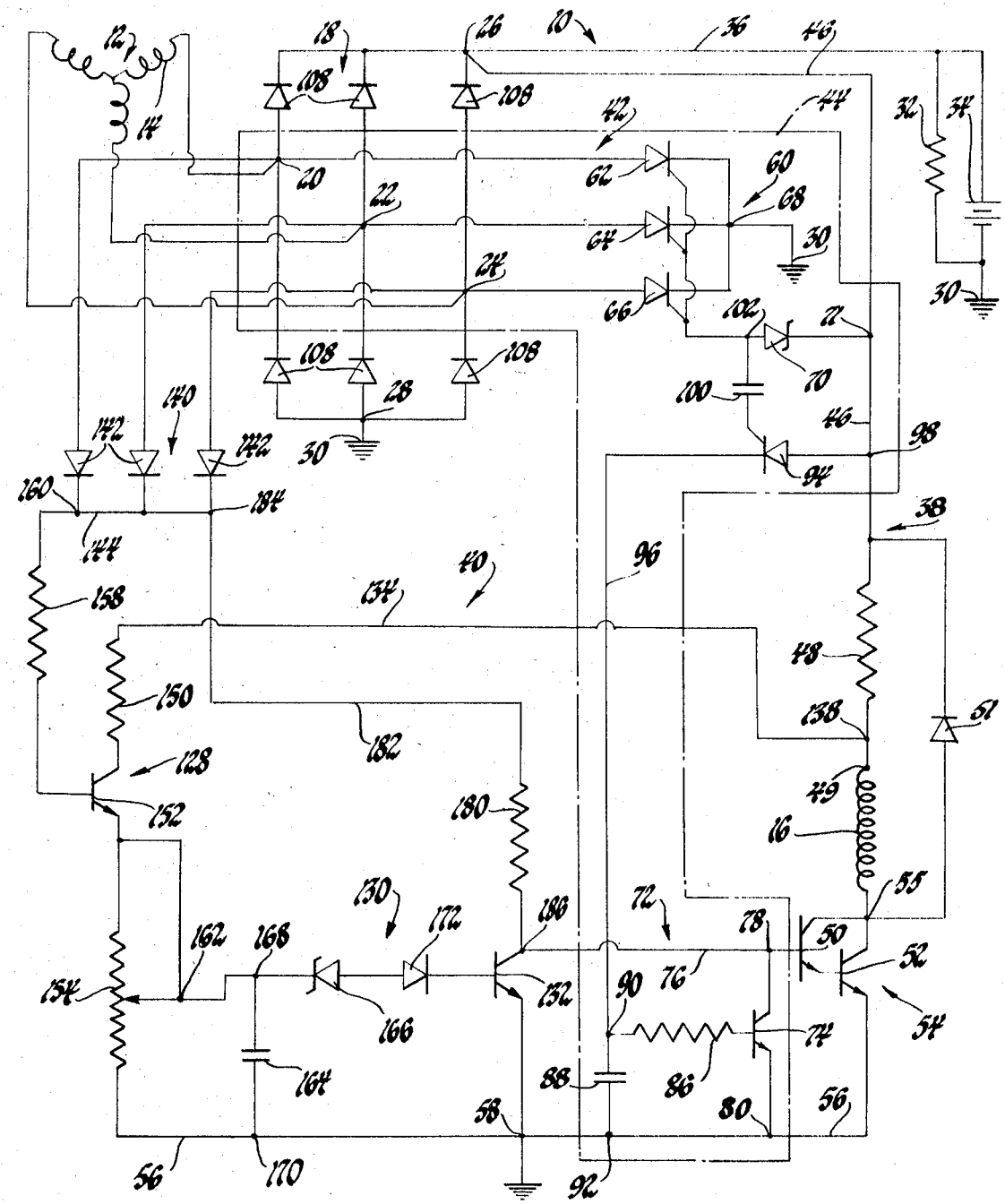
INVENTORS
Thomas E. Kirk, &
BY Gerald H. Stenklyft
Robert W. Smith
ATTORNEY

OVERVOLTAGE PROTECTION CIRCUIT FOR A GENERATOR REGULATOR SYSTEM

This invention relates to vehicle electrical generating systems and more particularly to an overvoltage protection circuit for preventing high transient voltages from being developed across the electrical components of a vehicle generating system.

In the electrical generating systems of motor vehicles, transistor regulating circuits are employed to control the voltage and current outputs of an engine driven generator which charges the vehicle battery and supplies other electrical loads. It has been found that during certain operating conditions excessive voltages are developed in the system and in one specific instance, high transient voltages occur when the electrical loads are suddenly disconnected from the generator output. This can occur, for example, by a loose connection at the generator output terminals or by inadvertent opening of a load disconnect switch with the system operating.

When the generator load changes abruptly to an open circuit condition, also referred to as a load-dumping situation, high energy is released at the generator output causing an instantaneous voltage rise. High potential transient voltages are produced which are capable of damaging the semiconductors and other electrical components connected, for example, in the generator regulating circuits. It is therefore desirable to protect these components from damage, or, otherwise, more expensive components having high voltage characteristics must be used.

It is further desirable to assure that the field winding is maintained deenergized when the overvoltage condition occurs so that the reactive field current will decay to a low value before being reenergized by the generator regulating circuits. Reactive field current normally flows when the inductive energy stored in the field winding discharges following turn off of field current. Due to the relative long time constant of the field winding circuit, the reactive current continues substantially longer than the high transient voltage. Accordingly, if current is supplied to field winding before the reactive current decays, further high voltage transients are developed at the generator output winding and the overvoltage condition will continue.

In accordance with this invention an overvoltage protection circuit is provided in a vehicle electrical generating system including a transistor voltage regulating circuit which controls the generator field current in response to a desired generator output voltage. A shunting circuit is provided including controlled rectifiers connected between the generator output winding terminals and a system ground connection. A control transitor is provided for deenergizing the field winding and is connected across the resistor-capacitor to the regulating circuit output transistor which is operative to switch the field current off and on. An overvoltage sensing device provided by a zener diode is connected to the gate electrodes of the controlled rectifiers of the shunting circuit and to the biasing circuit of the control transistor. They are rendered conductive when the zener diode reaches a predetermined breakdown voltage caused by an overvoltage condition developed in the generator output circuit. A resistor-capacitor time delay network is connected in the biasing circuit of the control transistor so that the output transistor is held nonconductive for a predetermined time. Accordingly, the field winding is maintained deenergized for a sufficient time to enable the reactive field current to become substantially fully discharged prior to the regulating circuits regaining control of the generator.

It is an object of this invention to provide an improved vehicle electrical generating system in which an overvoltage protection circuit prevents excessively high voltages from being developed across electrical components included in the system by shunting the generator output to ground and concurrently maintaining the field winding deenergized.

Another object of this invention is to provide a vehicle electrical generating system in which an overvoltage protection circuit is provided including a voltage breakdown sensing device for detecting excessive high voltage levels which are developed when the generator loads are suddenly disconnected from the system, and further in which a shunting circuit is provided for bypassing the high voltages developed at the output winding terminals to ground, and also, in which a control transistor biases a regulating circuit output transistor nonconductive so that the field winding is prevented from being energized until reactive field current is fully dissipated.

And a still further object of this invention is to provide an overvoltage protection circuit for a vehicle electrical generating system including an alternating current generator having an output winding connected to a power rectifier circuit in which the overvoltage protection circuit includes a plurality of controlled rectifiers which form a shunting circuit connected between the output winding and a grounded terminal and in which a zener diode is connected between the power rectifier circuit and the gating electrodes of the controlled rectifiers so that they are gated conductive when the zener diode conducts in response to an overvoltage condition, and further in which a control transistor is connected to a regulating circuit output transistor and includes a resistor-capacitor time delay network which biases the control transistor conductive for a predetermined time after an overvoltage condition develops so that the output transistor is biased nonconductive until the reactive field current has become sufficiently discharged prior to the generating system being returned to a normal operative condition.

Further objects and advantages of the present invention will be apparent from the following description, reference being had to the accompanying drawing wherein a preferred embodiment of the present invention is clearly shown.

In the drawing, a single FIGURE illustrates a schematic circuit diagram of an electrical generating system intended for use in motor vehicle and including an overvoltage protection circuit made in accordance with this invention.

Referring now to the drawing, a schematic circuit diagram illustrates an electrical generating system 10 for supplying direct current to electrical loads of a motor vehicle. The generating system 10 includes an alternating current generator 12 having a three-phase wye-connected output winding 14 and a field winding 16. The output winding 14 develops three-phase alternating current in response to the driven speed of the generator shaft and the current through the field winding 16.

A power rectifier circuit 18 is connected to the generator output winding terminals 20, 22 and 24 for developing the direct current output provided by the generating system 10. The upper and lower circuit junctions of the rectifier circuit 18 form a positive power output terminal 26 and a negative power output terminal 28, respectively. The terminal 26 is also referred to as the generator output since the rectifier circuit 18 is integrally mounted within the housing of generator 12. The negative power output terminal 28 is connected to a system reference point or potential indicated by numeral 30 which is provided by grounding the system to the vehicle chassis.

The vehicle electrical loads supplied by the electrical generating system 10 are represented by a resistive load 32 and a vehicle battery 34. A cable conductor 36 connects the positively poled terminals of the resistive load 32 and battery 34 to the power output terminal 26. The negatively poled terminals of the resistive load 32 and battery 34 are connected to the system ground 30 provided at the vehicle chassis. The voltages developed at the power output terminal are typically 12 or 24 volts DC.

The electrical generating system 10 further includes a field winding excitation circuit 38, a transistor voltage regulating circuit 40, and an overvoltage protection circuit 42 illustrated within the box outline designated 44. The field winding excitation circuit 38 connects the field winding 16 across the output winding 14 and the power rectifier bridge circuit 18 by a series circuit connection provided across the positive and negative power output terminals 26 and 28. A conductor 46 connects the power output terminal 26 to the upper end of a resistor 48. The upper end, 49, of the field winding 16 is connected to the lower end of the resistor 48. A field discharge diode 51 is connected with the indicated polarity across both the field winding 16 and the resistor 48.

A pair of NPN transistors 50 and 52, which are connected in a Darlington amplifier circuit arrangement, provide an output transistor switching device 54 of the voltage regulating circuit 40. The collector-emitter output circuit of the output transistor 54 is connected between the lower terminal 55 of the field winding 16 and a grounded conductor 56. The conductor 56 is connected to the ground potential 30 at junction 58 to complete the excitation circuit 38 connection between the positive and negative power terminals 26 and 28. The output transistor 54 is rendered conductive and nonconductive by the voltage regulating system 40, as described further hereinbelow, to regulate the field current supplied to the field winding 16.

The overvoltage protection circuit 42 includes a shunting circuit 60 comprising three controlled rectifiers 62, 64 and 66 of the silicon controlled rectifier (SCR) type having anode, cathode and gate electrodes. The anodes of the three controlled rectifiers are connected to the generator output terminals 20, 22 and 24, respectively, and the cathodes are connected together at circuit junction 68 which is connected to the ground 30. A zener diode 70 including a predetermined reverse breakdown voltage characteristic provides an overvoltage sensing device. The cathode of the diode 70 is connected to the conductor 46 at junction 71 and the anode electrode is connected to each of the gates of the three controlled rectifiers 62, 64 and 66.

The overvoltage protection circuit 42 further includes a field winding deenergizing circuit portion 72 including a control transistor 74. The control transistor 74 is an NPN type having base, collector and emitter electrodes. The collector is connected to a conductor 76 at junction 78 which is connected to the base of the transistor 50 and provides an input biasing connection to the output transistor 54. The emitter is connected to the conductor 56 at the junction 80 so the collector-emitter circuit is connected across the input biasing circuit of the output transistor 54.

A time delay network comprising a resistor 86 and capacitor 88 is connected across the base-emitter circuit of the control transistor 74. The base is connected to one end of the resistor 86 and the other end is connected to junction 90 formed between the resistor 86 and upper end of the capacitor 88. The lower end of the capacitor 88 is connected to the junction 92 of the conductor 56 and thereby to the emitter of the control transistor 74.

A single controlled rectifier 94 of the silicon controlled rectifier (SCR) type having cathode, anode and gate electrodes is included in the field deenergizing circuit 72 for charging the capacitor 88 and biasing the control transistor 74 conductive. The cathode of the controlled rectifier 94 is connected through the conductor 96 to the junction 90 and the anode is connected to the conductor 46 at junction 98. The gate of the controlled rectifier 94 is connected through a coupling capacitor 100 to the anode of the zener diode 70 at junction 102. The controlled rectifier 94 and the controlled rectifiers 62, 64 and 66 of the shunting circuit 60 are gated conductive when the zener diode 70 conducts reverse breakdown voltage in response to a predetermined overvoltage potential developed between the positive and negative power terminals 26 and 28, as described more fully hereinbelow.

Referring now more specifically to the remaining detail portions of the generating system 10, the power rectifier circuit 18 includes six silicon power diodes 108 connected in a conventional three-phase full-wave rectifier bridge arrangement with three upper diodes of the diodes 108 poled in a positive direction relative to the output winding terminals 20, 22 and 24 respectively. The cathodes of these three diodes are connected together at the power output terminal 26. The lower three of the six diodes 108 are poled in a negative direction relative to the output winding terminals 20, 22 and 24 and the anodes of these three diodes are connected together at the negative power terminal 28. A desired direct current output regulated at 24 volts, for example, is provided across the positive and negative power output terminals 26 and 28 in accordance with the arrangement and operation of the voltage regulating circuit 40 as described hereinafter.

The voltage regulating circuit 40 generally includes the output transistor 54 and a voltage responsive sensing arrangement including a voltage divider network 128, a voltage reference circuit 130 and a driver transistor 132. The voltage network 128 is connected to the generating system 10 by a conductor 134 which is connected to the junction 138 between the resistor 48 and upper terminal 49 of the field winding 16. The potential developed across the conductor 134 and ground provides a voltage sensing signal which varies in response to changes in the voltage developed across the positive and negative power output terminals 26 and 28. The resistor 48, so-called a "pickup resistor," varies the potential developed at junction 138 and on conductor 134 in response to increase and decrease of generator current. This is to increase or "pick up" the voltage sensing signal to increase the voltage provided across the loads 32 and particularly the battery 34 and thereby compensate for voltage drop occurring across the cable conductor 36 at increased generator current levels.

An auxiliary rectifier circuit 140 including three silicon power diodes 142 provides a source of direct current from the output winding 14 to the voltage regulating system 40. The three diodes 142 include cathode electrodes which are respectively connected to the output winding terminals 20, 22 and 24 and anode electrodes which are connected together by the conductor 144. The auxiliary rectifier circuit 140 forms a full-wave rectifier bridge with the lower three of the diodes 108 to produce a positive voltage on the conductor 144. A system turn off or disconnect feature is also provided by the auxiliary rectifier circuit 140 to block current flow from the battery 34 and through the voltage regulating circuit 40 or power rectifier circuit 18 when the system is not in use.

The voltage divider network 128 is formed by a series circuit including a fixed resistor 150, an NPN transistor 152 having collector, emitter and base electrodes, and a variable resistor 154. The upper end of the resistor 150 is connected to the conductor 134 to connect the voltage divider network 128 to the voltage sensing signal and the lower end of the resistor 150 is connected to the collector of the transistor 152. The emitter of the transistor 152 is connected to the upper end of the variable resistor 154 and the lower end of this resistor is connected to the conductor 56. The base of the transistor 152 is connected through a resistor 158 to the junction 160 on the conductor 144. The voltage developed at junction 160 forward biases the base-emitter circuit of the transistor 152 to render the collector-emitter circuit of the transistor conductive when voltage is developed in the output winding 14. This operatively connects the voltage divider network 128 across the conductors 134 and 56. The output of the voltage divider network 128 is provided at the junction 162 on the slider arm of the variable resistor 154. The junction 162 is connected to a capacitor 164 and a zener diode 166 at the junction 168. The capacitor 164 is further connected to junction 170 of the conductor 56 to filter fluctuating voltages developed across the output of the voltage divider network 128.

The voltage reference circuit 130 includes the zener diode 166 having a cathode electrode connected to the output of the voltage divider network at the junction 168. The anode electrode is connected to a silicon diode 172 which is poled in series opposition to the zener diode 166. The base of the driver transistor 132 is connected to the cathode electrode of the diode 172. The zener diode 166 has a predetermined reverse voltage breakdown characteristic intended to bias the base-emitter circuit of the transistor 132 conductive in accordance with the desired regulated voltage which is developed across the power terminals 26 and 28. The diode 172 is provided to compensate for temperature variations in the reverse voltage breakdown characteristics of the zener diode 166 whereby a substantially constant voltage response is provided regardless of changes in ambient temperature.

Referring further to the driver transistor 132, the emitter is connected to the conductor 56 at junction 58 and the collector is connected through a resistor 180 to conductor 182 which is connected to a junction 184 on the conductor 144. The collector is also connected at junction 186 to the conductor 76 connected to the base of the transistor 50 and the collector of the transistor 74, as noted hereinabove. The voltage occurring at the collector of the transistor 132 and at conductor 76 is developed by the positive voltage occurring at the junction 184 at the output of the auxiliary rectifier bridge 140. Accordingly, the voltage of the conductor 76 has a first predetermined value which is a positive level when the driver transistor 132 is nonconductive. The voltage of conductor 76 has a second predetermined value which is at a substantially lower level, approximately equal to ground potential at the conductor 56, when the collector-emitter circuit of the driver transistor 132 is rendered conductive.

The driver transistor 132 is normally nonconductive when the voltage at the junction 162 provides a voltage divider network output voltage below the voltage required to cause reverse voltage breakdown current flow in the zener diode 166. This voltage corresponds to a voltage being developed across the positive and negative power output terminals 26 and 28 which is below the desired regulated value. Accordingly, voltage at junction 186 is provided at the first predetermined value.

The driver transistor 132 is biased conductive when the zener diode 166 conducts when its reverse breakdown voltage characteristic is exceeded to provide forward biasing drive current through the base-emitter circuit of the transistor 132. The collector-emitter circuit of the transistor is rendered fully conductive so that voltage at junction 186 is provided at the second predetermined value. Accordingly, the driver transistor 132 and the voltage reference circuit 130 provide a voltage responsive means that is responsive to the voltage developed at the output of the voltage divider network 128 which in turn is proportional to the voltage developed across the positive and negative power output terminals 26 and 28.

The output transistor 54 of the voltage regulating circuit 40 is formed by the pair of NPN transistors 50 and 52 connected in the Darlington amplifier circuit arrangement as noted hereinabove. The coacting operation of the Darlington amplifier transistors 50 and 52 provides a switching function corresponding to that of a single switching transistor, thyristor or other gate-controlled semiconductor switching device. The collectors of the transistors 50 and 52 are connected together and to the lower terminal 55 of the field winding 16. The base-emitter circuits of the two transistors are connected in series between the conductor 76 and the conductor 56. Accordingly, both are biased conductive and nonconductive in a switching mode of operation in response to the first and second predetermined voltage values, respectively, which are developed on the conductor 76. The normal switching operation occurs at a relatively high rate so that the emitter-collector output circuit of the output transistor 54 switches the field current on and off rapidly to produce an average value of current flow which develops the desired regulated voltage across the positive and negative power output terminals 26 and 28.

When the voltage regulating circuit 40 renders the output transistor 52 nonconductive, the field winding excitation circuit 38 is deenergized from across the positive and negative power output terminals 26 and 28. Reactive field current flow is developed which discharges the stored inductive energy in the field winding 16. A counter inductive voltage develops to oppose the change in field current flow and causes the reactive field current to flow in the forward direction of the diode 51. The reactive field current is discharged through the diode 51 and the resistor 48 and decays as the stored energy is dissipated in heat.

Referring now to the operation of the overvoltage current protection circuit 42, when a predetermined level of overvoltage is developed by the output winding 14, as by high positive going transient voltages developed at terminal 26 when the generator load is suddenly disconnected, the critical voltage breakdown level of the zener diode 70, for example 50 volts, is reached so that is conducts current in the reverse direction. The high transient voltages developed at the generator output terminals 20, 22 and 24 are applied across the positive and negative power output terminals 26 and 28 and to the conductor 46. The current through the zener diode 70 from the conductor 46 supplies gating current to the controlled rectifiers 62, 64 and 66 so that they are rendered conductive. This shunts the generator output winding terminals 20, 22 and 24 through the low impedance path provided by the anode to cathode circuits of the controlled rectifiers to ground 30 at the junction 68.

At this time, the voltage drop developed across the output winding terminals 20, 22 and 24 and the power output terminals 26 and 28 will be substantially equal to the small voltage drop which develops across the conducting anode to cathode circuits of the controlled rectifiers 62, 64 and 66. This voltage is insufficient to maintain the zener diode 70 conductive and the gating current to the controlled rectifiers 62, 64 and 66 is interrupted. The alternating voltage occurring at the terminals 20, 22 and 24 is applied across the controlled rectifiers so they are reverse biased during the negative voltage cycles and are returned to a nonconductive state. The shunting circuit 60 will normally bypass the high transient voltages initially developed in the generator output winding 14 in a relatively shorter time then the time required to dissipate the reactive current in the field winding 16.

While the shunting circuit 60 is operative, the voltage developed on the conductor 46 drops to a low value corresponding to the voltage at the power output terminal 26 thus preventing the high transient voltages from being applied across the electrical components of the voltage regulating circuit 40. The low voltage developed on the conductor 46 causes the voltage regulating circuit 40 to be in an operative condition tending to energize the field winding 16 before the reactive field current has become discharged. Accordingly, the field winding deenergizing circuit 72 is provided to maintain the output transistor 54 nonconductive for a predetermined time which is in the range of 50 to 100 milliseconds. Otherwise, the output transistor 54 will be biased conductive to supply current to the field winding 16 which will add to the reactive field current. The current in the field winding 16 will then be effective to produce a reoccurrence of the overvoltage condition at the power output terminal 26. The controlled rectifiers 62, 64 and 66 would continue oscillating between conductive and nonconductive states and the overvoltage condition would continue.

The field winding deenergizing circuit 72 is rendered operative by the reverse voltage breakdown of the zener diode 70 at the same time the controlled rectifiers 62, 64 and 66 are rendered conductive. The high transient voltage which causes the zener diode 70 to conduct will also produce a triggering pulse through the coupling capacitor 100 to render the controlled rectifier 94 conductive. Following the conduction of the controlled rectifier 94, the capacitor 100 blocks current flow in the gating circuit of the controlled rectifier 94 so that it is isolated from the gating circuits of the controlled rectifiers 62, 64 and 66. If the capacitor 70 were not provided the conductor 96 would be prevented from reaching the potential of the conductor 46 developed by the high transient voltage condition due to a series circuit path including the cathode to gate circuit of the controlled rectifier 94 and the gate to cathode circuits the controlled rectifiers 62, 64 and 66 which are grounded at junction 68. The cathode to gate circuits would limit the voltage of the conductor 96 to a range of approximately seven to eight volts.

Accordingly, when the zener diode 70 applies a triggering pulse through the capacitor 100 to gate controlled rectifier 94 conductive the potential of the conductor 46 is connected to the conductor 96. This potential will be approximately 50 volts as determined by the reverse breakdown voltage characteristic of the zener diode 70. The capacitor 88 is charged from conductor 96 to a voltage of approximately 50 volts so that the base-emitter circuit of the control transistor 74 is forward biased. As the capacitor 88 is charged, the voltage developed at the junction 90 will raise the voltage at the cathode of the controlled rectifier 94 relative to the anode so that it is shut off since it is not sufficiently biased in the forward direction to sustain conduction.

The voltage rise at junction 90 also provides base to emitter drive current for forward biasing the transistor 74 to conduction. The capacitor 88 begins discharging through the resistor 86 when the controlled rectifier 94 shuts off. The time constant provided by the capacitor 88 and a resistor 86 is such that forward biasing drive current is maintained for a minimum of 50 to 100 milliseconds. Therefore, the time constant corresponds to the time interval required for the reactive field current to be discharged from field winding 16 and through the field discharge diode 51.

With the control transistor 74 being conductive, the potential of the conductor 76 is lowered to substantially the ground potential of the conductor 56 since there is negligible voltage drop across the conductive collector-emitter circuit of the control transistor 74. This provides the above-mentioned second predetermined voltage value on the conductor 76 so that the output transistor 54 is prevented from being biased conductive by the voltage regulating circuit 40. Accordingly, the field winding 16 cannot be energized from the field winding excitation circuit 38 until after the time provided for dissipating the reactive field current. The reactive field current will decay to a level such that additional field current will not produce an overvoltage potential at the positive and negative power output terminals 26 and 28 with the generator load disconnected.

Thus, the time delay network including resistor 86 and capacitor 88 assures that the field winding reactive current decays to a sufficiently low value so that the overvoltage potentials will not be redeveloped at the generator output. After the field winding 16 is discharged, the voltage regulating circuit 40 will be capable of regulating the generator output so that further overvoltages do not occur with the generator load circuit being open-circuited.

While the embodiment of the present invention as herein disclosed constitutes a preferred form, it is understood that other forms may be adopted within the spirit of this invention.

What We claim is as follows:

1. A motor vehicle electrical generating system for supplying direct current power at a voltage having a desired regulated value relative to a reference potential, said system comprising: an alternating current generator including an output winding and a field winding which produces voltage in said output winding when said field winding is supplied with current; a rectifier means having alternating current input terminals connected to said output winding and first and second direct current power output terminals, said first power output terminal supplying the desired value of regulated voltage to the electrical loads of said motor vehicle with said second power output terminal being connected to said reference potential; an output transistor operative between conductive and nonconductive states including emitter, collector and base electrodes; means connecting the collector-emitter circuit of said output transistor in a series circuit connection with said field winding and across said output winding for supplying current to said field winding when said output transistor is conductive; a voltage sensing circuit connected to said first and second power output terminals; means connecting said voltage sensing circuit to the base of said output transistor for developing a voltage having a first predetermined value which is operative to bias said output transistor conductive when the voltage across said first and second power output terminals is below said desired regulated value and having a second predetermined value which is operative to bias said output transistor nonconductive when the voltage across the first and second power output terminals is above said desired regulated value; a plurality of controlled rectifiers including anode, cathode and gate electrodes, means connecting the anode and cathode of each of said plurality of controlled rectifiers between said output winding and said reference potential so that said voltage produced in said output winding is shunted to said reference potential when said plurality of controlled rectifiers are gates conductive; a control transistor including collector, emitter and base electrodes, means connecting the collector-emitter circuit of said control transistor to the base of said output transistor to bias said output transistor nonconductive when said control transistor is conductive thereby deenergizing the current supply to said field winding; a time delay network including a capacitor and a resistor having a predetermined time constant connected to the base-emitter circuit of said control transistor; a single controlled rectifier including anode, cathode and gate electrodes; means connecting the anode and cathode of said single controlled rectifier in a series circuit with said time delay network and across said first and second power output terminals for charging said capacitor from the voltage occuring thereacross when said single controlled rectifier is gated conductive, the voltage developed across said capacitor being discharged through said resistor and the base-emitter circuit of said control transistor to bias said control transistor conductive for a predetermined time interval; and an overvoltage sensing device connected between said first power output terminal and each of said gate electrodes of said plurality of said controlled rectifiers and said single control rectifier, said overvoltage sensing device being rendered conductive in response to a predetermined level of a high transient voltage developed in said output winding and across said first and second power output terminals so that said plurality of controlled rectifiers and said single controlled rectifier are gated conductive, whereby said high transient voltage is shunted to said reference potential and concurrently said field winding is deenergized for said predetermined time interval.

2. A motor vehicle electrical generating system for supplying direct current power at a voltage having a desired regulated value relative to a reference potential, said system comprising: an alternating current generator including a three-phase output winding and a field winding which produces three-phase alternating-current voltage in said output winding when said field winding is supplied with current; a power rectifier circuit means having alternating current input terminals connected to each phase of said output winding and positive and negative output terminals, said positive output terminal supplying said direct current power at said desired regulated value of voltage said negative output terminal being connected to said reference potential; a direct current electrical load of said motor vehicle; a conductor means connecting said electrical load across said positive and negative output terminals for supplying said direct current power to said load; an output transistor including emitter, collector, and base electrodes operative between conductive and nonconductive states; means connecting the collector-emitter circuit of said output transistor in a series connection with said field winding and across said positive and negative output terminals for supplying current to said field winding when said output transistor is conductive; a voltage sensing circuit connected to said positive and said negative output terminals; means connecting said voltage sensing circuit to the base of said output transistor for developing a voltage having a first predetermined value which is operative to bias said output transistor conductive when the voltage across said positive and negative output terminals is below said desired regulated value and having a second predetermined value which is operative to bias said output transistor nonconductive when the voltage across said positive and negative output terminals is above said desired regulated value; a group of three controlled rectifiers including anode, cathode and gate electrode; means connecting the anode and cathode of each of said three controlled rectifiers between one phase of said output winding and said reference potential so that when said group of controlled rectifiers is conductive positively poled current paths are provided from said output winding to said reference potential; a zener diode having a predetermined breakdown voltage connected between said positive output terminal and each of said gates of said group of controlled rectifiers, said zener diode gating said group of controlled rectifiers conductive when said predetermined breakdown voltage is developed thereacross by a high transient voltage generated in said output winding by sudden disconnection of said electrical load; a control transistor including collector, emitter and base electrodes, means connecting the collector-emitter circuit of said control transistor to the base of said output transistor to bias said output transistor nonconductive when said control transistor is conductive thereby deenergizing the current supply to said field winding; a time delay network including a capacitor and a resistor connected together and across the base-emitter circuit of said control rectifier and having a predetermined time constant; a single controlled rectifier including anode, cathode and gate electrodes; a coupling capacitor means connected between said zener diode and said gate of said single controlled rectifier whereby said single controlled rectifier is gated conductive by a triggering pulse developed across said coupling capacitor means when said predetermined breakdown voltage is developed across said zener diode and being maintained conductive thereafter by forward poled voltage applied across the anode and cathode thereof; means connecting said anode and cathode of said single controlled rectifier in series with said capacitor of said time delay network and across said positive and negative power output terminals for charging said capacitor from the voltage developed across said output terminals when said single controlled rectifier is gated conductive, the voltage developed across said capacitor rendering said single controlled rectifier nonconductive by opposing the forward poled voltage and being discharged from said capacitor through a circuit path including said resistor and the base-emitter circuit of said control transistor thereby biasing said control transistor conductive for a predetermined time interval corresponding to the time constant to said time delay network, whereby said high transient voltage is shunted from said output winding to said reference potential and concurrently said field winding is deenergized for said predetermined time interval.